UNITED STATES PATENT OFFICE.

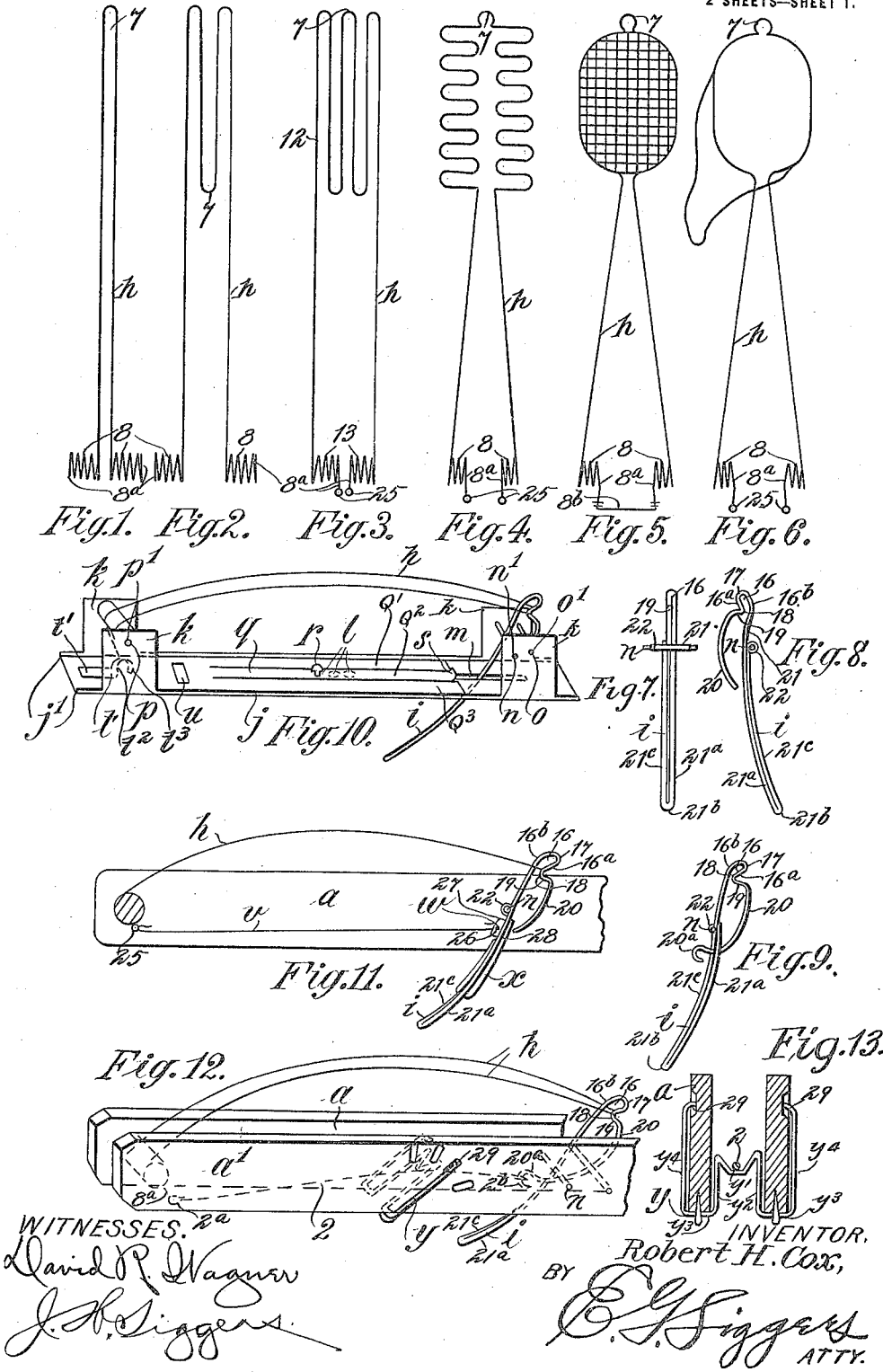

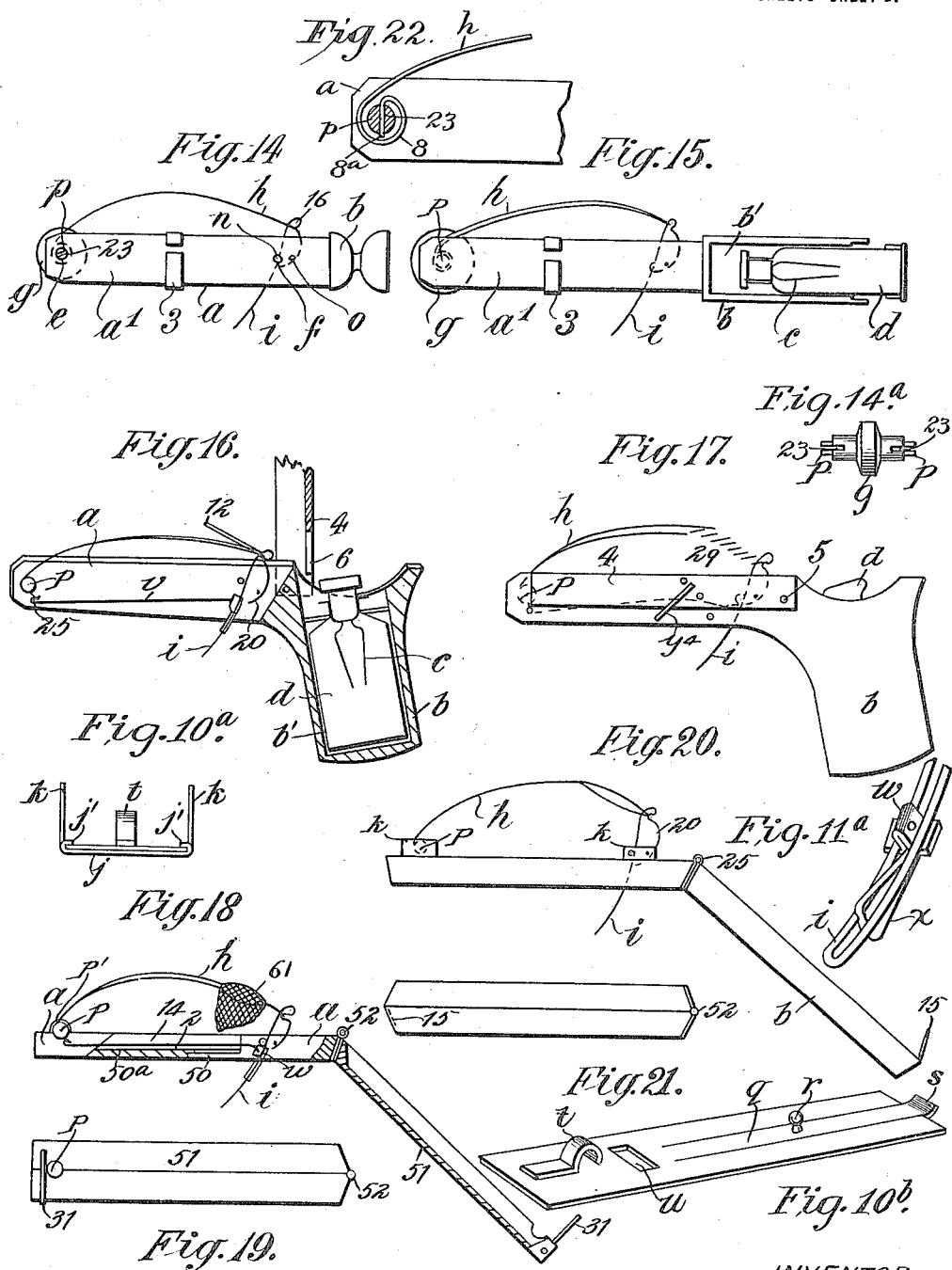

ROBERT HANHAM COX, OF LISTOWEL, IRELAND.

FLY-TRAP, &c.

1,164,536.     Specification of Letters Patent.      Patented Dec. 14, 1915.

Application filed April 14, 1913. Serial No. 761,038.

*To all whom it may concern:*

Be it known that I, ROBERT HANHAM COX, a subject of His Majesty the King of England, residing at Listowel, in the county of Kerry, Ireland, have invented a certain new and useful Improved Fly-Trap, &c., of which the following is a specification.

The invention relates to a new or improved fly-trap or hand instrument with a flail-like action for the capture and destruction of flies, wasps, and other insects; it being a well known fact that flies are capable of communicating various diseases to man, so that their destruction or partial destruction would be of benefit to mankind.

Referring to the drawings with reference to which I will now describe my invention: Figure 1 is an elevation of a spring actuated arm or striker having a single loop. Fig. 2 is a similar view of another form of spring actuated arm or striker having a central longitudinal loop. Fig. 3 is an elevation of a striker arm provided with a plurality of longitudinal loops. Fig. 4 is an elevation of a striker arm provided at opposite sides with transversely disposed loops. Fig. 5 is an elevation of a striker arm having a wire gauze head. Fig. 6 is an elevation of a striker arm equipped with a net for capturing insects. Fig. 7 is a plan of one form of trigger; Fig. 8 is a side elevation of Fig. 7; Fig. 9 is a similar view to Fig. 8 of a modified form of trigger; Fig. 10 is a perspective view of the frame pin and hole connection; Fig. 10$^a$ is an end view of the slide and slide holder with the pin and striker removed; Fig. 10$^b$ is a perspective view of the slide; Fig. 11 is a similar view of the trigger sliding-eye connection; Fig. 11$^a$ is a perspective view of the trigger shown in Fig. 11; Fig. 12 is a similar view of the trigger hook and crutch connection; Fig. 13 is a detail of the crutch; Fig. 14 is a plan view of a trap provided with a grooved handle or grip. Fig. 14$^a$ is a view in elevation of the pin shown in Fig. 4. Fig. 15 is a side elevation of a trap having a hollow handle containing an insect receptacle. Fig. 16 is a longitudinal sectional view of a trap having a hollow pistol grip for holding a receptacle for dead insects. Fig. 17 is a side elevation of a pistol grip trap having an oscillatory striker arm of the form illustrated in Fig. 4. Fig. 18 is a longitudinal sectional view of a foldable trap. Fig. 19 is a side elevation showing the same folded. Fig. 20 is a side elevation of a slightly different form of foldable trap. Fig. 21 is a similar view, the trap being folded. Fig. 22 is a detail sectional view showing the manner of fastening the spiral to the pin shown in Fig. 14.

In carrying my invention into effect I employ the following chief parts: Fig. 1 shows the spring striker $h$, consisting of a single piece of fine metal wire, bent at the middle to form a loop 7 with parallel sides, the ends of the loop being continued in a spiral spring 8, on either side, advancing on the same plane but at right angles to the loop. These spirals have, respectively right and left winding or threads of two or more rounds, terminating in short ends 8$^a$ bent across the middle of the last round for the purpose of fixing the striker in position. Wood, metal, celluloid, vulcanite or the like may replace the loop of the spring striker.

Figs. 7 and 8 show the trigger $i$, consisting also of a single piece of wire, but of greater thickness, bent near the middle to form a loop 16. Then, one side wire 16$^a$ is bent back at 17 in the same plane to form an angle of about sixty degrees and farther on the wire is again bent in the opposite direction to a right angle at 18. Continuing straight at 19, it is then given a rounded bend 20 and terminates. This curved part may be prolonged and pass through the double wire of the finger part to end in a hook 20$^a$, as hereafter described with reference to Fig. 9. The other side wire 16$^b$ of the loop is then bent toward its fellow till it touches or nearly touches the wire of the said angle 18 formed, proceeding straight and then recurving at 21$^a$ to form a segment of a circle. At the middle of this segment the wire is bent on itself at 21$^b$, in a plane at right angles to the curve, till the double wire 21$^c$ lies side by side and slightly apart to form the trigger finger part. A tube 22, with a small bore is soldered or otherwise fixed across the front surface of the doubled wire, to act as a bearing for the axle pin $n$.

The trigger as above described resembles a saber in shape; the apex 17 of the loop 16 being the pommel, the shorter side wire 20 forming the guard, while the longer side wire 21, 21$^a$ forms the handle and blade.

Fig. 14 shows the frame, made of wood, metal, vulcanite, celluloid or the like, which may be described as consisting of two parts, viz., a fore-part $a'$ and a handle $b$. The fore-part may be square or rounded, and is divided into two equal parts or rods by a vertical slot $a$. This long slot may be replaced by two shorter ones $a\ a$ as in Fig. 18 corresponding to its first and last portions, as hereafter described. The handle $b$ is shaped to fit the hand, being about the same as or of less length than the forepart, and may be hollowed out at $b'$ as in Figs. 15 and 16 to contain forceps $c$ and a bottle $d$ for dead flies. A hole $e$ Fig. 14 is drilled horizontally through both sides of the part $a'$ and a second smaller hole $f$ is drilled in the same way farther back.

The parts are fitted together in the following way, viz., a pin $p$ having a raised flange $g$ at the center and at each end a fine slot 23 cut, is passed into both spirals of the spring striker $h$ from the inside and the fixing ends $8^a$ of the spirals are fitted into the slots of the pin. The sides of the part $a'$ of the frame are then forced open enough to allow of the ends of the pin being fitted into the anterior holes $e$ from the inside, the loop resting forward and the part where the loop and spirals join being downward, the ends of the pin are inserted into the anterior holes and the rods pressed home. The trigger $i$ is then placed in the slot opposite the second holes $f$, with its bent loop 16 pointing upward and backward, and a pin $n$ is passed through the side portions of the part $a'$ and the small tube 22 of the trigger $i$ and made fast. Another pin $o$ is now passed through the rods in the same way in front of and in contact with the shorter side wire 20 of the trigger; so that when the finger part of the trigger is pulled back the anterior surface of the curved part 20 at the end of the shorter side wires bears against this second pin $o$ and thus forms a spring for the trigger during such movement.

If the loop of the spring striker $h$ be forced upward and backward and hooked on to the top of the trigger $i$, remaining held there by the resistance of the trigger spring till released by pulling the lower part of the trigger backward, the instrument is ready for use and only requires the adjustment of the force of the blow needed by turning the anterior pin with its flange $g$. The above describes the invention in its simplest form.

The ends 24 of the loop of the strikers may be bent at right angles toward each other and fastened to each other as shown in Fig. 5 or each may terminate in an eye or ring 25 see Figs. 3 and 4.

When the spring striker is not fixed to the anterior pin $e$ a connection appliance is necessary to link up the terminal loop or eyes 25 of the spring striker $h$ with either the frame or the trigger $i$, so that by pulling on the terminal loop or eyes, the flail like action of the spring striker may be rendered effective. Three forms of these means will now be described viz.,—the frame pin and hole connection; the trigger sliding-eye connection; the trigger hook and crutch connection.

The frame pin and hole connection shown in Fig. 10 consists of two parts, viz. a slide holder $j$ and a slide $q$. ($a$) The slide holder $j$ is a metal sheet with symmetrical flanges or projections $j'$ on either side. The projections $j'$, are bent up and over, so as to form sliding grooves or ways the whole length of the sheet $j$ on either side. The four projecting portions are then bent upward from the base, to form uprights $k$. Beginning at the center and extending along the middle line toward the trigger end three small holes $l$ are perforated through the sheet $j$, and, on the same line and in the same direction, a slot $m$ is also cut through, the end reaching as far as the middle of the right hand uprights. These uprights are also perforated with two holes, one $n'$ for the axle-pin $n$ of the trigger $i$ and the other $o'$ for its spring pin $o$. The left hand or larger uprights are also perforated as shown at $p'$ about half an inch up, to support the anterior pin $p$ of the spring striker $h$. ($b$) The slide $q$ is a metal sheet mounted to fit into and move freely in the grooves of the slide holder $j$, being divided into three equally wide strips $q'$, $q^2$, and $q^3$ from one end; and having near the center of the middle strip, a peg $r$ fixed, the head projecting upward and the point projecting through the under surface of the strip to engage in one or other of the three holes $l$ of the slide holder. The tip of this central slip is also turned slightly upward at $s$, to facilitate its movement when in contact with the lower part of the trigger as hereafter described.

A hook or hasp $t$ made from a strip or sheet metal straight at $t'$ for the first third, then bent to right angles at $t^2$ and curved downward at $t^3$ to form a single round of a flat spiral is soldered or otherwise fixed, by the straight part only, to the slide, the free curved part being immediately under the holes of the larger uprights when the slide $q$ is in position and the peg $r$ in the first-hole. Now, the slide having been passed into the grooves $j'$ of the slide holder $j$, the spring striker $h$ in position between its uprights, and the trigger $i$ with its two pins also in position, the terminal loop $8^b$ of the spring striker $h$ shown in Fig. 5 is carried under and into the circular hasp $t$ and the peg $r$ is placed in the first hole $l$. Then by pulling back the end of the spring striker and hooking it onto the top of the trigger, the pulling of the trigger will release the striker, causing it to strike with small force. If the peg $r$ be moved to the next hole $l$ and the former actions repeated the blow struck will be greater, and, with the peg in the third hole, still greater force will be obtained. If the words "Flies" "Bluebottles" and "Wasps" be placed in this order on the upper surface of the slide holder $j$, a short distance down from the spring striker uprights and a transverse slot or window $u$ be cut through the slide above the strips, each word may be caused to appear by moving the peg into its appropriate hole, and the user thus guided as to the force to be employed. This peg $r$ is automatically removed from the hole (when the striker is hooked on to the trigger) by pressing the lower part of the trigger forward and upward. For the middle strip, acting as a spring to keep it in the hole, is lifted up by contact at its end $s$ with the lower part of the trigger when the pull of the spring striker causes the slide to shoot back to the first strength which movement always takes place on closing the frame when the connection is in position.

The trigger sliding-eye connection is shown in Fig. 11. This second form of connection appliance consists of (a) a moderately fine wire $v$ long enough to reach from the terminal loop or eyes of the spring striker to the finger part of the trigger below the axle pin and having a hook at each end, and (b) a sliding eye for attaching it to the trigger. The pulling of the trigger is communicated to the spring striker in two ways, viz. by tightening the spring and then by releasing the striker. The force of the blow to be struck is regulated by sliding the eye $w$, held between the double wires $21^a$ and $21^c$ of the finger part of the trigger $i$, slightly up or down. The sliding eye consists of two parts, viz. an eye $w$ and a clamp $x$. The eye $w$ is made by folding a piece of metal sheet, on itself end to end, drilling a hole 26 close inside the middle of the fold, to receive the hook of the wire, and turning the ends 27 outward to a right angle. The clamp $x$ is a piece of wire bent till the sides lie parallel and in contact except at the bend. On each side of this bend a rounded notch 28 is cut in the direction of the groove formed by the doubled wire to receive and slip along the inner surface of the trigger wires. The doubled wire is then shaped to the same curve as the finger part of the trigger, the short side being the concave one. The end of the longer side is then soldered or otherwise fixed to the sliding eye at the groove formed at the base of the opened out ends, having the fold in the direction of the concavity of the wire. It is placed in position by pressing the short free wire and doubled portion of the sliding eye through the doubled wire of the trigger $i$, from the convex side, sliding it up to the desired position, and then hooking the connection wire into the eye-hole 26.

The trigger hook and crutch connection is shown in Fig. 12. This third form of connection appliance requires slight changes in the form of the trigger, viz., the greater separation of the rounded wires $21^a$ and $21^c$ forming the finger part of the trigger, and the lengthening of the shorter side wire 20, so that it is continued on the same curve through the parallel wires $21^a$ and $21^c$ of the finger part of the trigger and ending there in a hook $20^a$ as shown in Fig. 9. A crutch $y$ see Fig. 13 is made by bending a piece of thick wire in the center to form a small loop $y'$; rebending each side back on itself till the unbent sides are parallel at $y^2$ and then bending each to a right angle outward at $y^3$; and again to the same angle and having the sides again parallel at $y^4$ and with inturned ends. A wire 2 furnished with hooks $2^a$ and $2^b$ at each end, long enough to reach from the terminal loop eyes of the spring striker $h$ to the extra hook $20^a$ of the trigger $i$ is provided. This connection appliance is placed in position by linking up the lower loop or eyes $8^a$ of the spring striker $h$ and the extra hook $20^a$ of the trigger $i$ with the double hooked wire 2. By inserting the central portion $y'$ of the clutch $y$ into the slot $a$ of the forepart of the frame from below, having the outer arms of the crutch outside, till the last bend $y^3$ comes in contact with the lower surface of the sides of the front part $a'$ of the frame at a position in front of the axle-pin $n$ of the trigger $i$, where it is made fast by small staples $y^5$ fixed into the under surface by each rod and astride of the wire. The connection wire, resting in the loop of the crutch $y'$, can now be raised by moving up the ends 29 of the outer arms of the crutch, whereby increased tension is put on the spring striker hooked to the trigger, causing a blow of greater force to be struck when the trigger is pulled. Shallow depressions 30 in the outer sides of the rods of the frame or in the sides of the shield, are placed at intervals in the course traveled by the turned-in end of the arms of the crutch, to receive these arm endings and so regulate the force of the blow.

As the spring striker and other parts are liable to injury when not in use, shields, to suit the different forms of the invention, are necessary for their protection. These are as follows:—The split-hoop shield 3 shown in Figs. 14 and 15 is a narrow band of metal, bent-around and in contact with the forepart. It is made use of by slipping the side wires of the spring striker through the gap of the hoop, turning the hoop slightly around and then by pushing the hoop along the forepart until it reaches and covers the end of the finger part of the trigger which also causes the rim of the trigger to work into the slot of the frame.

The hood shield 4 shown in Figs. 16 and 17, is made of a piece of metal sheet one end of which is hinged on to the frame by passing a pin 5 through both sides and through the frame. This end of the shield is so shaped as to allow its other end being lifted up to right angles with the frame. A slot 6 is cut through the upper surface in the middle line, to allow of the passage of the upper portion of the trigger when in the upright position, and for its free movement in engaging and releasing the spring striker. It is made use of in the following way:—In operation the shield is lifted up as shown in Fig. 16, and the spring striker is then hooked on the trigger. Next the finger part of the trigger is pressed forward until flush with the under surface of the fore-part and at the same time the shield is pressed down till its sides grip in grooves made in the fore-part to receive them. The top of the trigger is thus held down, by that portion of the shield immediately behind the slot, holding also the finger part flush with the fore-part below, and the whole spring striker is covered except the spirals at the end.

A folding handle shield is shown in Figs. 18, 19, 20 and 21. The fore-part and handle, instead of being of one piece, may be joined together by a hinge to afford a pistol like grip and to greatly reduce the size of the instrument when closed.

The following describes the invention in its principal different forms; the reference numerals refer to the various forms of the accompanying drawings:—The device shown in Fig. 14 comprises a frame, a cylinder; a fore-part $a'$ and a handle $b$, grooved for gripping; and formed with a slot through the total length of the fore-part. There is a spring striker formed as a single loop with outward spirals of four or more rounds. The pin is fixed as shown in Fig. 1. The trigger is of the simple form shown in Figs. 7 and 8. There is also a shield, and a split-hoop, as indicated at 3. The force adjustment is produced by turning the anterior pin by means of its flange $g$. The frictional engagement between the ends of the pin and the sides of the frame will ordinarily be sufficient to hold the pin in such rotary adjustment, but if desired any other suitable means may be employed for this purpose.

The device shown in Fig. 15 comprises a frame; and a fore-part as described in Fig. 14 above. It has a hollow handle $b$, containing bottle $d$ with stopper and forceps $c$; the bottom of the bottle is fixed inside the cap for closing the handle. There is a spring striker having a double loop, spirals outward, four or more rounds, pin fixed as shown in Fig. 2. There is a simple trigger as shown in Figs. 7 and 8 and a split-hoop shield 3. Force adjustment can be made by turning the anterior pin by means of its flange $g$.

Fig. 16 has a pistol shape frame with slotted fore-part. The handle is hollowed out from above to contain a flat bottle $d$ and stopper with forceps $c$. The spring striker comprises a three-fold loop 12 with inward spirals 13 of two or more rounds and an eye ending as shown in Fig. 3. The connection appliance is a trigger sliding eye as shown in Fig. 11. The trigger is simple as shown in Figs. 7 and 8 and the shield is as indicated at 4.

In Fig. 17 the frame shown is as described in Fig. 16 above. The spring striker is as shown in Fig. 4. The connection appliance is as shown in Fig. 12. The trigger has an extra hook as shown in Fig. 9 and the shield is as indicated at 4. Force adjustment is possible by moving the arms of the crutch up for strength and down for weakness.

In Fig. 18 the frame comprises a folding forepart having a slot $a$ which is cut out of one end, for the spirals of the spring striker, and, near this end the rods on either side are grooved transversely on the upper surface to form a bed for the anterior pin $p$, which is held there by a small staple $p'$ astride and fixed into each rod 60. A slot $a$ is cut for the trigger and is further enlarged by a deep groove 14 in the middle line of the upper surface—to receive the top of the trigger when the frame is closed—and a like groove 50 extends from the other end of the slot, on its under surface, to receive the finger part of the trigger at the same time. Extending from one slot to the other in the middle line a groove 50 is cut for the wire 2 of the connection appliance. The handle 51 is joined at the closed end by a hinge 52. This handle 51 is hollowed out from above, to receive the bend of the spring striker and the anterior pin and also contains small forceps for grasping insects caught in the net 61. A locking-loop 31 is fastened at both outer sides to hold the instrument shut. The spring striker is as shown in Fig. 6. The connection appliance is as shown in Fig. 11. The trigger is as shown in Figs. 7 and 8. The handle is folded over to form a shield. Force adjustment is obtained by pushing up the sliding eye $w$ for weakness and pulling it down for strength.

In Fig. 20 the frame is like a folding box, the forepart is metal tray with sides sloping slightly outward and reduced at one end to allow of the free action of the spring striker. These sides are of double thickness of the metal almost the whole way down, forming flanges 62, each side having the metal bent back inward on itself, thus forming a groove 63 inside for holding the slide holder of the connection appliance as shown in Fig. 10. A slot is cut through the bottom of the tray in the median line sufficiently wide to allow of the easy working of the finger part of the trigger. The handle is also a metal tray and the low-walled end of the fore-part is increased in width and slopes inward at 15, to fill the gap at the end of the fore-part when closed. A small forceps for picking up dead flies is held by a clip in the hollow of the handle.

The method of using the invention is as follows:—All the forms described are used in the same way once they are opened and the spring striker hooked on to the trigger. The handle is grasped in the hand with the fore-part projecting forward and the fore finger on the trigger below. The instrument is then quietly advanced toward the fly, pointing in a direct line with it, till the end of the instrument is about three or three and a half inches from the fly. Then the trigger is pulled, releasing the spring striker, the outer part of which strikes the fly and compresses it against the substance upon which it rests. With the butterfly net spring striker the flies or other insects can be captured without injury. Removal of flies killed or captured indoors is advisable. This is best accomplished by using the forceps, provided with most of the instruments described, and the bottles containing spirits of wine, supply a fitting temporary receptacle, which, when full, should be emptied and the contents set on fire. The force of the blow should be adjusted according to the size of the insect by means of the regulator, and care should be taken not to use force enough to rupture the integument of the insect.

What I claim as my invention and desire to secure by Letters Patent of the United States is:—

1. An instrument for the capture and destruction of flies, wasps, and like insects, comprising a frame, a spring actuated oscillatory striking arm mounted on the frame and arranged to swing beyond and below the same, said striking arm being provided at its outer end with insect engaging means, means for holding said striking arm in a position ready to be released, and means for releasing said striking arm to cause the same to strike with a flail-like action at the object aimed at.

2. An instrument for the capture and destruction of flies, wasps, and like insects, comprising a frame, a spring actuated oscillatory striking arm mounted on the frame and arranged to swing beyond and below the same, said striking arm being provided at its outer end with insect engaging means, means for holding said arm or trigger in a position ready to be released, means for regulating the tension on said arm when so held, and means for releasing said striking arm to cause the same to strike with a flail-like action at the object aimed at.

3. An instrument for the capture and destruction of flies, wasps, and like insects, comprising a frame, a spring actuated oscillatory striking arm formed from wire and mounted on the frame, said striking arm being arranged to swing beyond and below the frame and provided at its outer end with insect engaging means, means for holding said striking arm in a position ready to be released, and means for releasing said striking arm to cause it to strike with a flail-like action at the object aimed at.

4. An instrument for the capture and destruction of flies, wasps and like insects, comprising a frame, a spring actuated oscillatory arm or striker formed from wire to swing beyond the frame, said arm supporting a net mounted thereon, means for holding said spring actuated arm or striker in a position ready to be released and means for releasing said arm or striker to cause it to strike with a flail-like action at the object aimed at for the purpose described.

5. An instrument for the capture and destruction of flies, wasps, and like insects, comprising a frame, a bent wire oscillatory striking arm mounted on the frame and arranged to swing beyond and below the frame and provided at its outer end with insect engaging means, a trigger for holding and releasing said striking arm, and means for varying the tension of the said arm and for thereby varying the strength of the blow struck by the arm.

In testimony whereof I have signed this specification in the presence of two subscribing witnesses.

ROBERT HANHAM COX.

Witnesses:
BEN JOHNSTON,
C. JOHNSTON.